United States Patent [19]

Stettler et al.

[11] Patent Number: 5,362,345
[45] Date of Patent: Nov. 8, 1994

[54] METHOD OF MANUFACTURING INTEGRAL RAILWAY COACH BODIES

[75] Inventors: Andreas Stettler, Lutzenberg; Kurt Anderegg, Rheineck, both of Switzerland

[73] Assignee: Inventio AG, Hergiswil NW, Switzerland

[21] Appl. No.: 11,397

[22] Filed: Jan. 28, 1993

[30] Foreign Application Priority Data

Jan. 28, 1992 [CH] Switzerland ............... 00 227/92-5

[51] Int. Cl.$^5$ ................. B65H 81/00; B61D 17/04
[52] U.S. Cl. .................... 156/173; 156/169; 105/396; 105/397; 296/901
[58] Field of Search ............ 156/173, 169, 292; 105/248, 397, 396; 296/901

[56] References Cited

U.S. PATENT DOCUMENTS

| | | |
|---|---|---|
| 3,372,075 | 3/1968 | Holt et al. |
| 3,730,796 | 5/1973 | Richards et al. ............ 156/173 |
| 3,989,562 | 11/1976 | Hladik et al. ............ 156/173 X |
| 5,042,395 | 8/1991 | Wackerle et al. ............ 296/901 X |

FOREIGN PATENT DOCUMENTS

| | | |
|---|---|---|
| 1344536 | 10/1968 | France. |
| 1778493 | 8/1971 | Germany. |
| 2308226 | 8/1974 | Germany ............ 156/173 |
| 2351250 | 4/1975 | Germany ............ 156/173 |
| 1490575 | 11/1977 | United Kingdom. |
| 2177973 | 2/1987 | United Kingdom. |
| WO8301924 | 6/1983 | WIPO. |

*Primary Examiner*—Jeff H. Aftergut
*Attorney, Agent, or Firm*—Howard & Howard

[57] ABSTRACT

A method for the manufacture of integral coach bodies includes the steps of winding an inner covering layer on a body-shaped winding core and attaching a plurality of U-shaped channel segments to outer surfaces of ceiling and floor walls and attaching a plurality of insulation segments in corner regions of the body. A stiffening framework is attached to the outer surfaces of side walls of the body, insulation plates are attached in some rectangular openings in the stiffening framework and blank covers are positioned in other ones of the openings for subsequently installing windows and doors. The attached elements form a step-tree surface upon which is wound an outer covering layer. The coach body thus manufactured is removed from the winding core, the blank covers are cut out for the door and window openings, apertures are formed in the inner covering layer for the feed and removal of air and openings are formed for mounting illumination devices in the ceiling wall. One or both of the covering layers can be formed with a sandwich type construction having a first winding layer, an insulation mat attached to an outer surface of the first winding layer, and a second winding layer wound over the insulation mat.

18 Claims, 3 Drawing Sheets

METHOD OF MANUFACTURING INTEGRAL RAILWAY COACH BODIES

BACKGROUND OF THE INVENTION

The present invention relates generally to a method for the manufacture of large integral bodies and, in particular, to a method of manufacturing railway coach bodies.

There is shown in the British patent specification GB 1 490 575 a coach body, which is manufactured by a winding method and which comprises an inner winding layer, a stiffening framework, insulation positioned in the stiffening framework and an outer winding layer. Recesses for the reception of ventilation, heating, electrical, illumination and sanitary devices are provided between the inner and the outer winding layer. The inner winding layer, the stiffening framework, the insulation and the outer winding layer form a self-supporting coach body.

A disadvantage of the above described known method is that the coach body has regions with insufficient insulation. Furthermore, such a coach body can be damaged by the longitudinal forces which arise when the body is coupled in a train.

SUMMARY OF THE INVENTION

The present invention concerns a method of manufacturing a coach body having a self-supporting lightweight construction, in which the stiffening framework, insulation segments and channel segments are tied together by winding layers of fibers.

The method for the manufacture of integral coach bodies having a self-supporting lightweight structure according to the present invention comprises the steps of: a. winding an inner covering layer on a winding core, the winding core having a desired size and shape of a coach body, the inner covering layer having a generally rectangular cross section with a ceiling wall, a floor wall and a pair of spaced apart side walls connected by four curved corner regions; b. attaching a plurality of channel segments to an outer surface of each of the ceiling wall and the floor wall and attaching insulation segments to outer surfaces of the corner regions; c. attaching a stiffening framework to outer surfaces of the side walls and to the outer surfaces of the ceiling and floor walls, the stiffening framework having a plurality of openings formed therein; d. positioning an insulation plate in less than all of the openings in the stiffening framework; e. winding an outer covering layer on the winding core over the channel segments, the insulation segments, the stiffening framework and the insulation plates to form a partial coach body, the inner and outer covering layers being formed with a sandwich type construction having a first winding layer, an insulation mat attached to an outer surface of the first winding layer, and a second winding layer wound over the insulation mat; and f. removing the partial coach body from the winding core. The method further comprises the steps of removing the blank covers for the door and window openings, forming apertures in the inner covering layer for the feed and removal of air and forming openings for mounting illumination devices in the ceiling wall. One or both of the covering layers can be formed with a sandwich type construction having a first winding layer, an insulation mat attached to an outer surface of the first winding layer, and a second winding layer wound over the insulation mat.

The advantages achieved by the invention are that it results in the manufacture of coach bodies having lightweight structure which includes the ceiling, the floor, ventilation and electrical channels, thermal and acoustic insulation, locations for various devices, carriers and framework required for strength as well as tension and compression rods for the transmission of longitudinal forces. Further advantages are that a variation of the thicknesses of the sandwich formed by and between the inner and outer skins is possible at favorable costs for optimization of the ratio of own weight and carrying capacity, that thermal bridges in the lightweight structure stiffened by metallic profiles and weak points in respect of sound insulation are avoided by a closed insulation layer.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
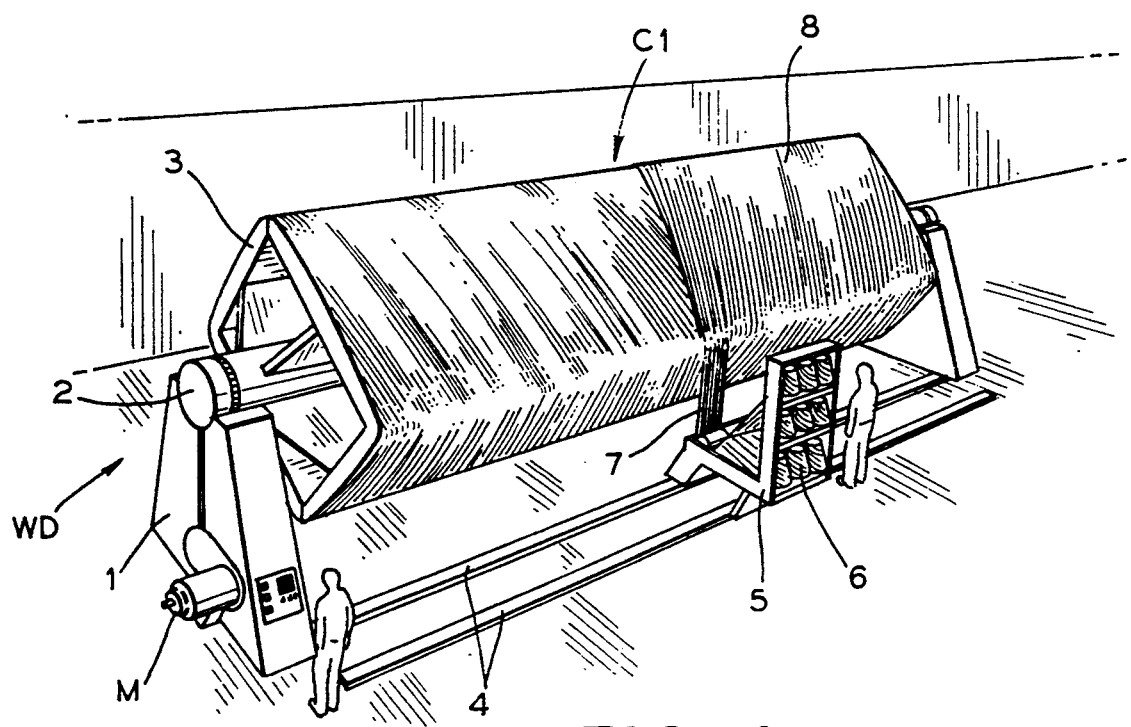
FIG. 1 is a perspective view of a winding device for large structures on which an inner covering layer for a coach body is being wound in accordance with the method of the present invention.

A winding device WD is shown in the FIG. 1 which device can be utilized to perform the method according to the present invention. The winding device WD includes a pair of spaced apart fixed winding blocks 1, a mandrel 2 supported at opposite ends by the winding blocks 1 and driven in rotation by a drive means such as an electric motor M mounted on one of the winding blocks 1. A winding core 3 is mounted on the mandrel 2 and is formed with a size and shape corresponding to a desired a body to be manufactured such as a railway coach body having a generally rectangular tubular cross section with generally planar walls connected by curved corner regions. A winding material 6 is in the form of a plurality of spools of fibers and/or rolls of fabric. The fibers and fabric are made from glass fibers, carbon fibers or natural fibers which are guided together into a strand 7 and impregnated by a resin material. The winding material 6 is mounted on a material carder 5 which moves on a pair of rails 4 extending generally parallel to a longitudinal axis of the mandrel 2. In order to manufacture an inner covering layer 8, as well as additional intermediate and outer layers (not shown), the strand 7 is wound onto the winding mandrel 3, which mandrel rotates about its longitudinal axis, in a spiral pattern in two or more mutually crossing alternating direction layers to for a partial coach body C1.

Figure 2:
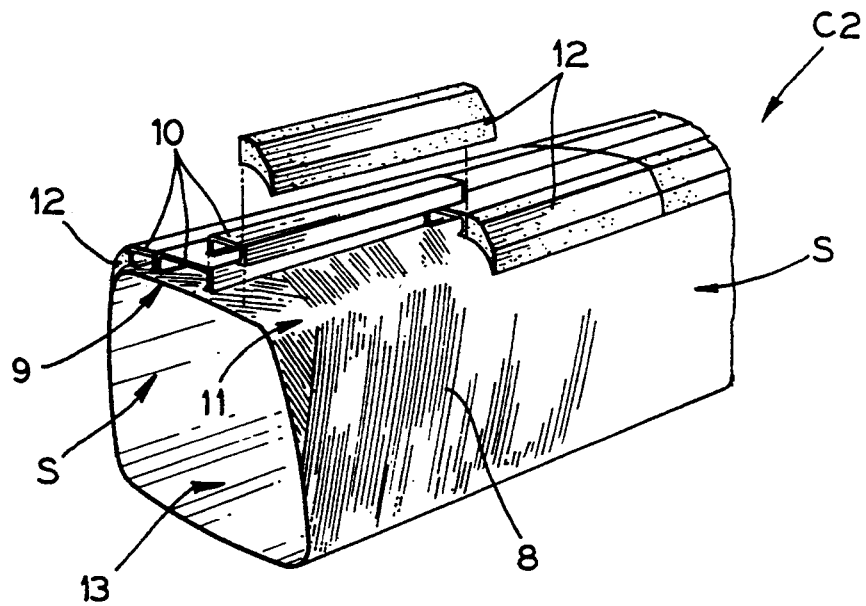
FIG. 2 is a perspective cross-sectional view of the coach body shown in the FIG. 1 with channel segments and insulation segments attached to the inner covering layer in accordance with the method of the present invention.

As shown in the FIG. 2, the inner cow;ring layer 8, which is formed on and carried by the winding mandrel 3, has attached to an outer surface thereof a plurality of generally U-shaped channel segments 10 for the location of devices which introduce and remove air, illuminate and perform other functions. The channel segments 10 are attached to the outer surface of the inner layer 8 in an area of a ceiling wall 9. Also attached to the outer surface of the inner layer 8 in four corner regions 11 are shape-determining insulation segments 12. An analogous structure (shown in the FIG. 7) can be attached to an outer surface of a base or floor wall 13 of the coach body. The channels 10 and the insulation segments 12 can be attached by any suitable means such as an adhesive. The ceiling wall 9, the floor wall 13 and a pair of side walls S extend between the corner regions 11 and combine with the channel segments 10 and the insulation segments 12 to form a partial coach body C2. As defined by the winding core 3, the ceiling wall 9, the channels 10, the: floor wall 13 and the side walls S are generally planar and the corner regions 11 and the insulation segments 12 are generally curved in profile for ease of winding.

Figure 3:
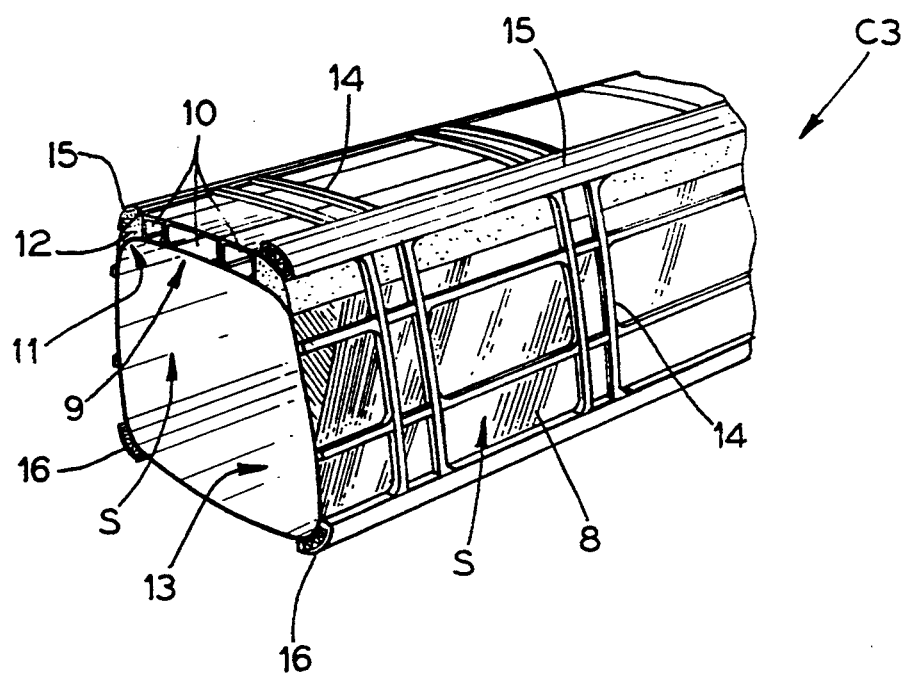
FIG. 3 is a perspective cross-sectional view similar to the FIG. 2 showing a stiffening framework and corner segments attached to the inner covering layer in accordance with the method of the present invention.

A stiffening framework 14 and pairs of corner segments 15 and 16 are attached to the outer surface of the coach body as shown in the FIG. 3 for the absorption of bending stresses and longitudinal forces. A portion of the stiffening framework 14 is attached to an outer surface of the channels 10 and a pair of upper corner segments 15 are attached to an outer surface of the insulation segments 12. Another portion (not shown) of the stiffening framework 14 is attached to an outer surface of the floor wall 13 and a pair of lower corner segments 16 are attached to an outer surface of insulation segments (not shown) at the lower corners of the coach body. A further portion of the stiffening framework 14 is attached to an outer surface of each of the side wall S. The stiffening framework 14 and the pairs of corner segments 15 and 16 are attached to the inner covering layer 8 by any suitable means such as an adhesive. The stiffening framework 14 can be formed from a plurality of extruded aluminum material stringers which extend longitudinally and transverse to the longitudinal axis of the coach body and are connected together by suitable fasteners. The four corner segments 15 and 16 extend longitudinally and their outer surfaces are curved for ease of winding on an outer layer as discussed below. The corner segments 15 and 16 can be formed from an extruded aluminum material and their cross-sectional area depends on the requirements of the static stresses which occur in the coach body. The addition of the stiffening framework 14 and the pairs of corner segments 15 and 16 to the coach body C2 forms a partial coach body C3.

Figure 4:
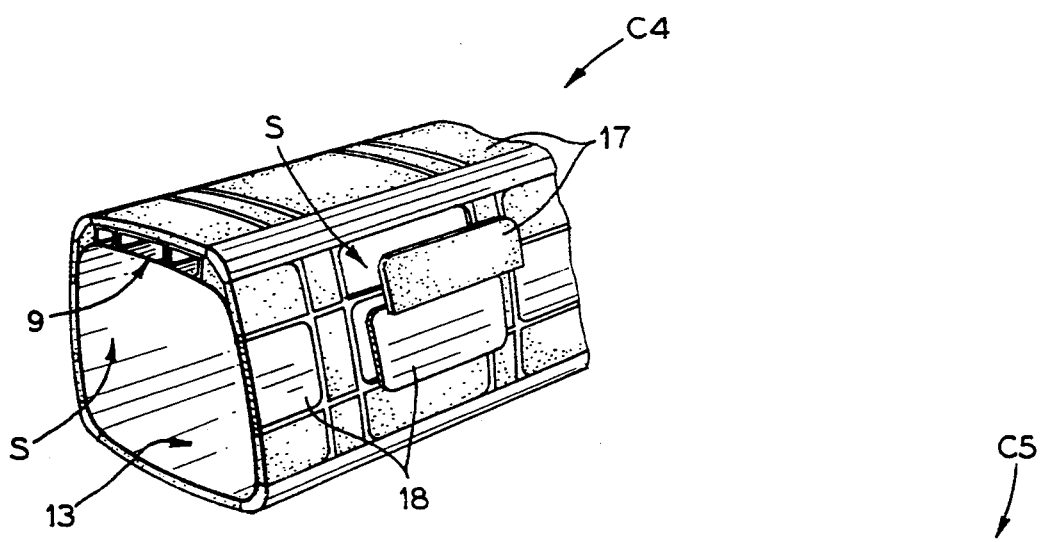
FIG. 4 is a perspective cross-sectional view similar to the FIG. 3 showing insulation plates and blank covers attached to the inner covering layer in accordance with the method of the present invention.

In the FIG. 4, there are shown insulation plates 17 and blank covers 18 which are attached to the coach body in corresponding rectangular openings formed between the stringers of the stiffening framework 14. Every rectangular opening in the framework receives one of the insulation plates 17 with the exception of openings which correspond to the future windows and doors of the coach body. The openings for the windows and doors are filled with the: blank covers 18 which are removed in a later step as explained below. Alternatively, the openings can each be fitted with a metal plate at the inside and a second metal plate at the outside and the hollow spaces between the metal plates filled with foam. The addition of the insulation plates 17 and the blank covers 18 forms a partial coach body C4 having a step-free surface which can be wound over. In another alternate embodiment, frames for doors and windows can be positioned in the corresponding openings and used as the blank covers.

Figure 5:
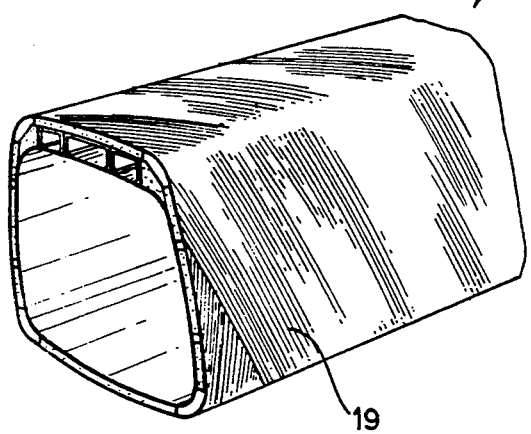
FIG. 5 is a perspective view similar to the FIG. 4 showing an outer covering layer wound over the previously assembled components of the body in accordance with the method of the present invention.

The coach body C4 is wound over with an outer covering layer 19 as shown in the FIG. 5 to form a partial coach body C5. The outer covering layer 19 can be formed in the same manner and with the same material as the inner covering layer 8.

Figure 6:
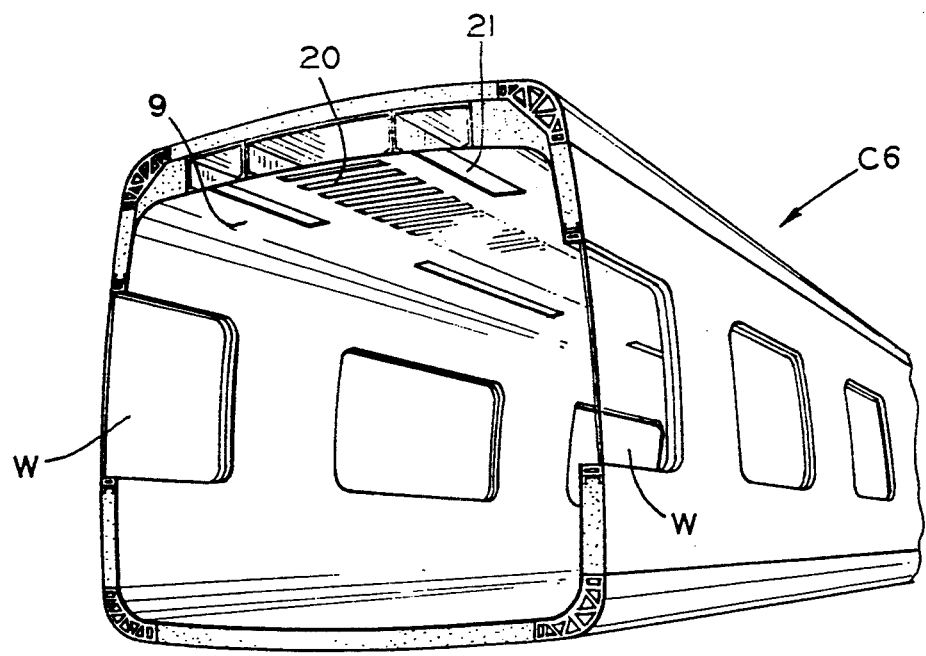
FIG. 6 is a perspective cross-sectional view of the coach body show in the FIG. 5 with the blank covers removed and various apertures and openings formed in the ceiling.

The coach body C5 manufactured in accordance with the preceding method steps is removed from the shape-determining winding core 3 and the blank covers 18, or alternatively the frames, positioned in openings for the windows and doors are removed. As shown in the FIG. 6, windows W and doors (not shown) can be installed. Apertures 20 for the feed and removal of air, as well as openings 21 for mounting illumination devices, are formed in the ceiling wall 9 resulting in a partial coach body C6.

Figure 7:
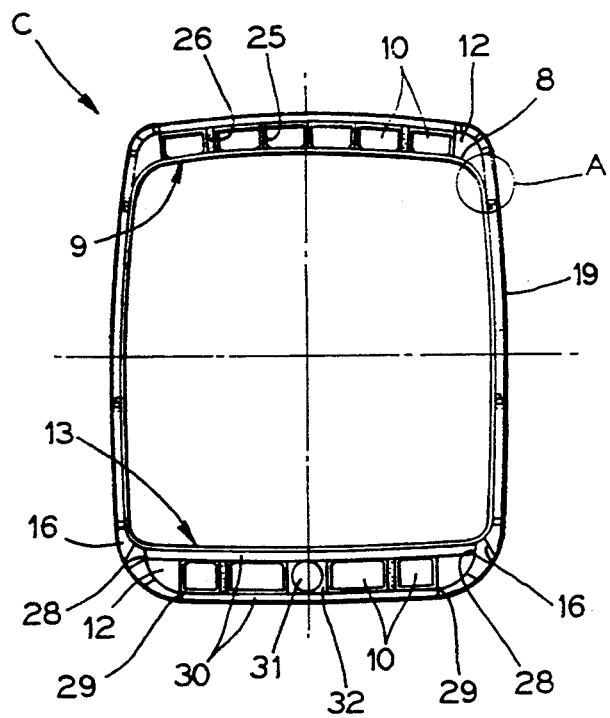
FIG. 7 is a cross-sectional end view of a coach body manufactured in accordance with the method of the present invention.
Figure 8:
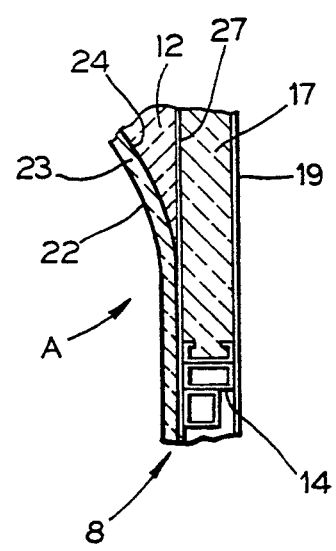
FIG. 8 is an enlarged fragmentary view of a portion of the wall of the coach body shown in the FIG. 7.

FIG. 7 is a cross-sectional end view of a coach body C with a detail portion A shown enlarged in the FIG. 8. The inner covering layer 8 is formed with a sandwich type construction with an insulation mat 23 attached to an outer surface of a first or inner winding layer 22 over the entire coach body. The insulation mat 23 is covered over with a second or intermediate winding layer 24 over the entire coach body. Thus, the thermally conducting stiffening framework 14 is spaced and insulated from the inner surface of the coach body C, whereby so-called thermal bridges are avoided. As shown in the FIG. 7, some of the U-shaped channel segments 10 are reinforced by interior webs 25 and adjacent ones of the channel segments 10 are separated by longitudinally extending molded foam pieces 26. The channel segments 10 and the insulation segments 12 are attached to the outer surface of the second or intermediate winding layer 24 at the ceiling wall 9. Subsequently, the entire surface of the coach body C is wound over by a third or outer winding layer 27 (FIG. 8). In an alternate embodiment, the outer covering layer 19 can be of a similar sandwich construction to that shown in the FIG. 8 for the manufacture of the inner covering layer 8.

In order to save weight, the thicknesses of the winding layers are matched to the stresses which occur over the length of the coach body. The lower corner profiles 16, which are to be wound over, have a first upper point of connection 28 and a second lower point of connection 29 at which a pair of spaced apart stiffening transverse carriers 30 are connected in the area of the floor wall 13. Spaces, in which U-shaped channel segments 10 for the accommodation of equipment as well as, for example, electrical devices, are formed in the intermediate region between the transverse carriers 30. Access to the intermediate area is by way of not illustrated base openings which, like the window and door openings, are cut out at selected ones of the openings in the framework 14 in a later method step. Buffer plates (not shown) positioned at opposite ends of the coach body C are connected by a tension and compression rod 31 extending longitudinally in the intermediate region between the transverse carriers 30 so that the longitudinal forces generated in a train of connected coaches are passed directly through the rods 31 and not through the walls and other construction elements of the coach body. The tension and compression rod 31 is supported its entire length and protected against buckling by a surrounding foam material filling 32 and the winding over by the outer covering layer 19.

The above described method of manufacturing a body is suitable also for the manufacture of other large volume components for elevator cars, buses, mobile homes, shipping and storage containers, cooling housings, truck and railway vehicle mounted containers for pourable goods, emergency housing and pedestrian footbridges.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the manufacture of integral coach bodies having a self-supporting lightweight structure comprising the steps of:
   a. winding an inner covering layer on a winding core, the winding core having a desired size and shape of a coach body, said inner covering layer having a generally rectangular cross section with a ceiling wall, a floor wall and a pair of spaced apart side walls connected by four curved corner regions;
   b. attaching a plurality of channel segments to an outer surface of each of said ceiling wall and said floor wall and attaching insulation segments to outer surfaces of said corner regions;
   c. attaching a stiffening framework to outer surfaces of said side walls and to outer surfaces of said channel segments and said insulation segments, said stiffening framework having a plurality of openings formed therein;
   d. positioning a plurality of insulation plates in less than all of said openings in said stiffening framework;
   e. winding an outer covering layer on the winding core over and in contact with said stiffening framework and said insulation plates to form a partial coach body, at least one of said inner and outer covering layers being formed with a sandwich type construction having a first winding layer, an insulation mat attached to an outer surface of said first winding layer, and a second winding layer wound over said insulation mat; and
   f. removing said partial coach body from the winding core.

2. The method according to claim 1 including positioning a blank cover in at least one of said openings not receiving one of said insulation plates before performing the step e. whereby one of a window and a door can be installed in said opening receiving said blank cover.

3. The method according to claim 1 including positioning a pair of spaced apart metal plates in at least one of said openings not receiving one of said insulation plates and filling a space between said metal plates with a foam material before performing the step e. whereby one of a window and a door can be installed in said opening receiving said metal plates.

4. The method according to claim 1 including positioning a frame in at least one of said openings not receiving one of said insulation plates before performing the step e. whereby one of a window and a door can be installed in said opening receiving said frame.

5. The method according claim 1 including attaching upper corner segments and lower corner segments to said stiffening framework and to said outer surfaces of said corner regions before performing the step e., said corner segments having an outer curved surface capable of being wound over.

6. The method according to claim 5 including positioning a pair of spaced apart transverse carriers below said floor wall and connecting said lower corner segments to opposite ends of said transverse carriers before performing the step e.

7. The method according to claim 6 including positioning a longitudinally extending tension and compression rod between said transverse carriers and connecting said rod to said transverse carriers.

8. A method for the manufacture of integral coach bodies having a self-supporting lightweight structure comprising the steps of:
   a. winding an inner covering layer on a winding core, the winding core having a desired size and shape of a coach body, said inner covering layer having a generally rectangular cross section with a ceiling wall, a floor wall and a pair of spaced apart side walls connected by tour curved corner regions;
   b. attaching at least one channel segment to an outer surface of each of said ceiling wall and said floor wall and attaching insulation segments to outer surfaces of said corner regions;
   c. attaching a stiffening framework to outer surfaces of said side walls and to outer surfaces of said channel segments and said insulation segments, said stiffening framework having a plurality of openings formed therein;
   d. positioning an insulation plate in at least one of said openings in said stiffening framework;
   e. attaching upper corner segments and lower corner segments to said stiffening framework and to said outer surfaces of said corner regions, said corner segments having an outer curved surface capable of being wound over;
   f. positioning a pair of spaced apart transverse carriers below said floor wall and connecting said lower corner segments to opposite ends of said transverse carriers;
   g. positioning a longitudinally extending tension and compression rod between said transverse carriers and connecting said rod to said transverse carriers;
   h. winding an outer covering layer on the winding core over and in contact with outer surfaces of said stiffening framework, said insulation plate, said upper and lower corner segments and said transverse carriers to form a partial coach body, at least one of said inner and outer covering; layers being formed with a sandwich type construction having a first winding layer, an insulation mat attached to an outer surface of said first winding layer, and a second winding layer wound over said insulation mat; and i. removing said partial coach body from the winding core.

9. The method according to claim 8 including positioning a blank cover in at least another one of said openings in said stiffening flamework before performing the step h. whereby one of a window and a door can be installed in said another one opening.

10. The method according to claim 8 including positioning a pair of spaced apart metal plates in at least another one of said openings in said stiffening framework and filling a space between said metal plates with a foam material before performing the step h. whereby one of a window and a door can be installed in said another one opening.

11. The method according to claim 8 including positioning a flame in at least another one of said openings in said stiffening flamework before performing the step h. whereby one of a window and a door can be installed in said another one opening.

12. The method according to claim 8 wherein the steps a. and h. are performed by winding a resin-impregnated fiber strand in a spiral pattern in two or more mutually crossing alternating direction layers for each of said covering layers.

13. The method according to claim 12 wherein said fiber strand is formed of a plurality glass fibers.

14. The method according to claim 12 wherein said fiber strand is formed of a plurality of carbon fibers.

15. The method according to claim 12 wherein said fiber strand is formed of a plurality of natural fibers.

16. A method for the manufacture of integral coach bodies having a self-supporting lightweight structure comprising the steps of:

a. winding an inner covering layer on a winding core, the winding core having a desired size and shape of a coach body, said inner covering layer having a generally rectangular cross section with a ceiling wall, a floor wall and a pair of spaced apart side walls connected by four curved corner regions;

b. attaching a plurality of channel segments to an outer surface of said ceiling wall and attaching insulation segments to outer surfaces of said corner regions;

c. attaching a stiffening framework to outer surfaces of said side walls and to outer surfaces of said floor wall, said channel segments and said insulation segments, said stiffening framework having a plurality of openings formed therein;

d. positioning an insulation plate in less than all of said openings in said stiffening framework;

e. winding an outer covering layer on the winding core over and in contact with outer surfaces of said stiffening framework and said insulation plates to form a partial coach body; and f. removing said partial coach body from the winding core.

17. The method according to claim 16 wherein at least one of said inner and outer covering layers is formed with a sandwich type construction having a first winding layer, an insulation mat attached to an outer surface of said first winding layer, and a second winding layer wound over said insulation mat.

18. The method according to claim 16 wherein the step b. includes attaching a molded foam piece to said outer surface of said ceiling wall between adjacent ones of said channel segments.

* * * * *